United States Patent [19]
King

[11] 3,847,408
[45] Nov. 12, 1974

[54] SINGLE SHAFT SULKY

[76] Inventor: Joseph H. King, 930 John Anderson Dr., Ormond Beach, Fla. 32074

[22] Filed: Sept. 13, 1971

[21] Appl. No.: 179,931

[52] U.S. Cl. .............................................. 280/63
[51] Int. Cl. ........................................ B62d 27/04
[58] Field of Search .............................. 280/63, 64

[56] References Cited
UNITED STATES PATENTS

| | | | |
|---|---|---|---|
| 283,722 | 8/1883 | Ostmire | 280/63 |
| 350,169 | 10/1886 | Stillman | 280/63 |
| 815,841 | 3/1906 | Lapham | 280/63 |
| 3,628,806 | 12/1971 | Weber | 280/63 |

FOREIGN PATENTS OR APPLICATIONS

| | | | |
|---|---|---|---|
| 412,119 | 4/1910 | France | 280/63 |

*Primary Examiner*—Robert R. Song
*Attorney, Agent, or Firm*—Jones, Tullar & Cooper

[57] ABSTRACT

A flexible harness racing sulky structure for providing an interaction between the driver, sulky and horse to obtain improved performance is disclosed. The sulky comprises a streamlined, flexible arch having a pair of wheels supported at its outer ends on individual axles, the axles being mounted behind the torsional axis of the arch. A single, flexible shaft is secured to the midpoint of the arch and extends upwardly and forwardly for a single point connection to the horse's harness, the length of the shaft being adjustable to provide a spring constant dependent upon the characteristics of the horse. A driver's seat is adjustably secured to the midpoint of the arch, and extends rearwardly thereof.

9 Claims, 3 Drawing Figures

PATENTED NOV 12 1974　　　　　　　　　　3,847,408

SINGLE SHAFT SULKY

BACKGROUND OF THE INVENTION

This invention relates to a racing vehicle specifically invented and developed for use in harness racing, which is generally defined, as in the New York State Law, as being racing performed by a horse hitched to a sulky, buggy or similar type vehicle.

There has been little change in the sulky used in harness horse racing in the last 50 or more years and the design is one derived thru evolution and adaptation of the single horse drawn buggy which provided two shafts, one on either side of the horse to contain the horse and keep him from becoming entangled with the harness when left unattended at a hitching post. The last major change in this vehicle occurred when pneumatic tired wheels were adopted in place of the large diameter steel rimmed wooden wheels.

SUMMARY OF THE INVENTION

It is the objective of this invention to provide a vehicle which will increase both the speed of the horse and his ability to sustain this speed over the distance of the race.

This objective is accomplished by a vehicle as shown in the accompanying drawings which is sufficiently flexible to provide a unique and novel interaction between the horse, driver, and vehicle, whereby greatly improved performance is obtained. The vehicle incorporates a stiff, yet flexible streamlined support arch generally in the shape of a wide, inverted U. Wheels are attached to the depending end leg portions of the support arch by means of axles located aft of the torsional axis of the arch, the location of the wheel axles providing a castoring effect on the wheels when vertical forces are applied to the cross member of the U-shaped support arch by the weight of the driver or the motion of the horse. Secured to the midpoint of the support arch is a single, curved, flexible shaft which extends upwardly and forwardly for attachment to a single point on the horse's harness. The shaft is provided with both vertical and horizontal adjustments to permit variation in the height and length of the shaft, whereby the flexibility, and thus the spring constant, of the shaft can be tuned to the characteristics of various horses and drivers. A driver's seat is also adjustably secured to the cross member of the support arch.

The construction of the present sulky overcomes the problems experienced with conventional racing vehicles and provides numerous advantages which may be summarized as follows:

1. The streamlined shape of the support arch and the location of the footrests for the driver reduce the wind drag of the vehicle and driver by eliminating the multiplicity of small and large struts and parts rised in prior vehicles and by placing the complete body of the driver directly in the wake of the horse.

2. The single pole and its single connection point to the horse's harness eliminates the interference with the horse's motion caused by the attachment of a conventional sulky by two shafts and two tugs.

3. The harness arrangement permitted by the single connection point eliminates the lung constricting action produced by the method of attachment of the currently employed conventional sulky when attached to a pulling horse.

4. The flexibility and adjustability of the present sulky and the location of the wheel axles converts the vertical motion and associated forces of the horse, the driver, and the sulky into a forward and upward thrust during that portion of the horse's stride that his feet are not touching the ground.

These advantages have been proven in a series of state regulated paramutual races in which the sulky has been used on both trotters and pacers. The race results show an unusually high percentage of the horses attached to this sulky have placed either first or second and that the sulky helped these horses to race from 1/5 of a second to 5 seconds faster over the mile distance thus demonstrating that this invention is providing new and unique results.

BRIEF DESCRIPTION OF THE DRAWINGS

The foregoing and additional objects, features and advantages of the invention will become apparent from the following detailed description of a preferred embodiment thereof, taken in conjunction with the accompanying drawings, in which.

DESCRIPTION OF A PREFERRED EMBODIMENT

Figure 3:
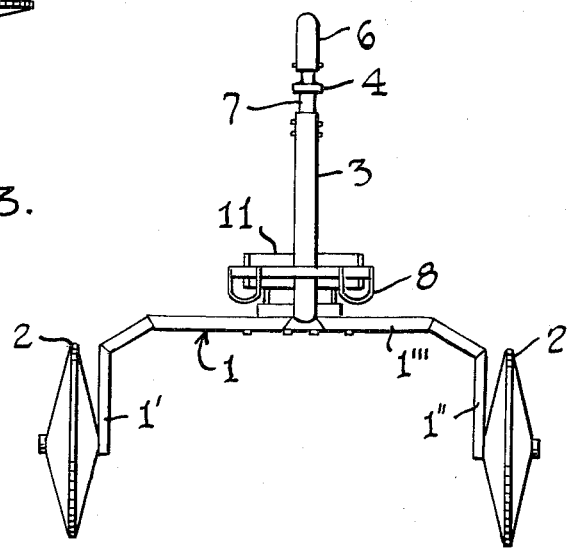
FIG. 3 is a front elevation of the vehicle of FIGS. 1 and 2.

Turning now to a detailed consideration of the drawings, it will be seen that the vehicle of the present invention consiats of an arched support, or arch axle 1, which is generally in the shape of an inverted U, with depending legs 1' and 1'' (FIG. 3) joined by a cross member 1''', and which has a streamlined cross section to minimize wind drag. Wheels 2 are attached at either side of the arch axle by means of axles supported in the depending leg portions 1' and 1''.

From the center of the arched support, or frame, a single shaft 3 extends up and forward over the horse to a single point attachment 4 on the back pad of the horse's harness 5. The Single Shaft 3 is provided with fore and aft adjustment 6 and vertical adjustment 7 to allow the length and height of the shaft to be varied to fit both the conformation of the horse and his gait at top speed. Adjustable foot rests 8 are attached to the lower portion of the single shaft 3 in such a fashion as to insure that the drivers legs and feet travel in the "air wake" of the horse and therefore produce less wind resistance than they do in the conventional two shafted sulky where they are totally exposed, and are directly in the wind stream.

The drivers seat 9 extends aft from the arch axle 1 on which it is mounted by means of supports 9' and 9''. The seat is adjustable as at 10 and 10' to permit the distance between the arch axle and the seat to be modified so that the driver's weight can be carried at a location to give: maximum beneficial lift on the horse by the sulky; minimum air drag; and when coupled with the spring constants of the shaft 3, arch 1 and wheels 2, the greatest forward and upward thrust to the horse during that portion of the horse's stride that his feet are not touching the ground.

The seat is provided with a curved portion 11 which firmly grips the hips of the driver when he presses with his feet on the foot rest 8, thus providing fore and aft and lateral stability to the driver.

The flexibility of the single pole, the arch axle and the seat support produces, when the sulky is being pulled by a horse, a natural fore and aft frequency of the sulky which is expressed by the following equation $$f_n = \tfrac{1}{2} \sqrt{k/m}$$

$f_n$ = natural frequency $k$ = the spring constant of the shaft 3, arch 1 and wheels 2 and seat support 9 in producing a fore and aft vibration $m$ = the effective mass of the driver and sulky in producing a fore and aft vibration Variations in the spring constant of the sulky are provided by adjusting the length of the single shaft 3 at adjustment 6, by adjusting the height of the single shaft at 7, by adjusting the length of the seat supports 10 and 10', and by varying tire inflation, so that drivers of varying weights can be accomodated to give to the driver-sulky combination a fore and aft vibration frequency which will match that of the horse at which he attains his maximum speed and will result in an upward and forward thrust on the horse while he is in that portion of his stride that his feet are not touching the ground. This action has been reproduced in a full scale dynamic model of the horse driver, and sulky combination and shown to provide a beneficial result in converting vertical motion of horse and driver into a forward thrust of the sulky on the horse.

The single point attachment 4 produces new and unique results because of its ball joint action and because of its placement at the top center line of the back pad 5. The ball joint action insures that the horse does not have to be subjected to any of the uncomfortable twisting imposed by prior sulky and harness arrangements. The placement of the single point attachment at the top center line of the back pad insures that all forces transmitted are reacted directly thru the crouper, check rein or girth without producing the chest constricting tourniquet action encountered in the currently used attachment of the conventional two shafted sulky, when large forces are transmitted between horse and sulky.

Figure 1:
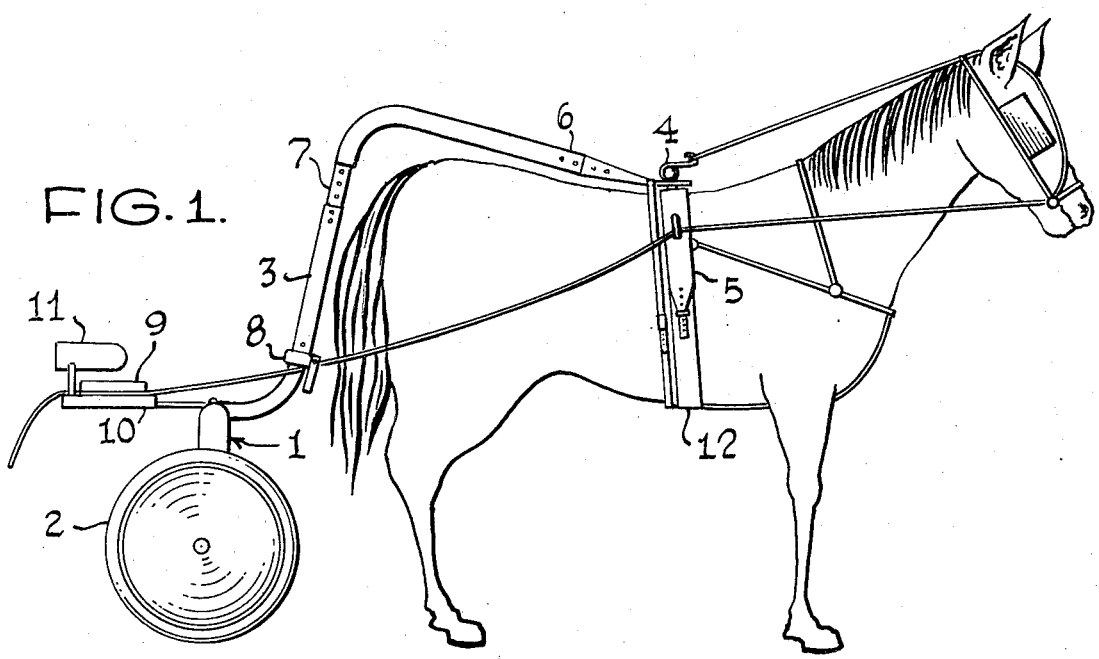
FIG. 1 is a side elevation view of the racing vehicle of the present invention, showing its relation to and manner of attachment to a horse.
Figure 2:
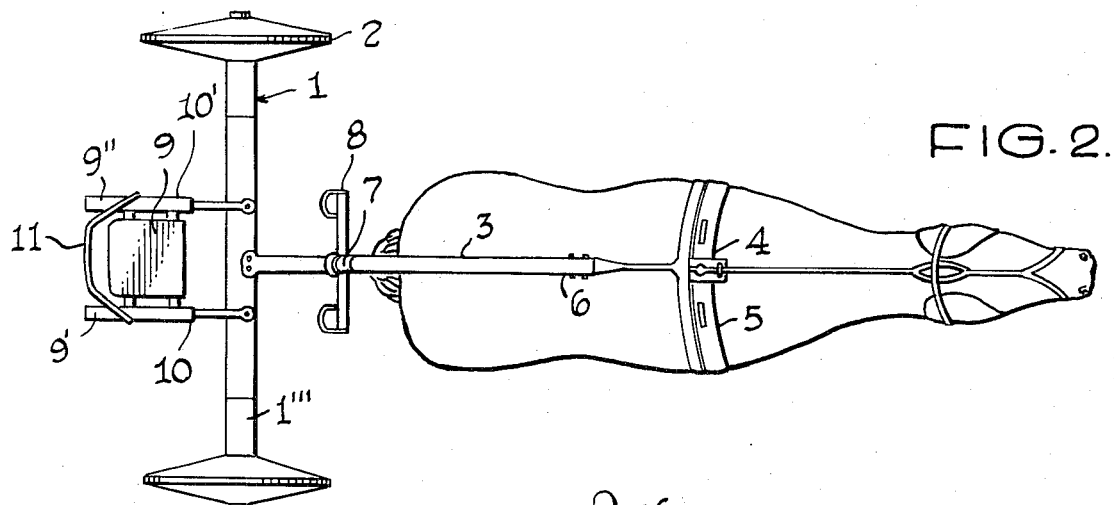
FIG. 2 is a top plan view of the vehicle and horse of FIG. 1.

The rotational axis of the wheel 2 is placed aft of the elastic axis of the arch axle 1 as shown in FIGs. 1 and 2, in order to produce a drag-reducing castoring action and to produce a forward force in response to any flexing action resulting from vertical motion of either the horse or the driver, or of both together.

I claim:

1. A sulky for use in harness horse racing, comprising:
    arch axle frame means having an elastic axis and having first and second ends;
    wheel means secured to each of said first and second ends of said arch axle frame means, the rotational axes of said wheel means being placed aft of the elastic axis of said arch axle frame means to produce a drag-reducing castoring action in said wheel means;
    an adjustable seat secured to and extending aft of said arch axle frame means; and
    a shaft having a single point connection adapted to be secured to the harness of a horse, said shaft being secured to said arch axle frame means and extending upwardly and forwardly over said horse when said sulky is connected to the horse's harness, said shaft, seat, and arch axle frame means being flexible and having a spring constant to produce a fore and aft motion of said sulky at a frequency which conforms to the gait of the horse.

2. The sulky of claim 1, wherein said arch axle frame means is generally U-shaped, having a cross member to which said seat and said shaft are secured and first and second depending leg portions at said first and second ends to which said wheel means are secured.

3. The sulky of claim 1, wherein said shaft is adjustable in both length and height, whereby said shaft will fit horses of various conformations and gaits.

4. The sulky of claim 3, wherein said shaft is a single shaft connected to the midpoint of said cross member.

5. The sulky of claim 4, wherein said single point connection for said shaft comprises a ball joint connector placed centrally on the back pad of the horse's harness.

6. A sulky for use in harness horse racing, comprising:
    arch frame means having first and second ends;
    wheel means secured to the ends of said arch axle means;
    adjustable seat means secured to and extending aft of said arch axle means; and
    shaft means having a rearward portion secured to said arch axle frame means and a forward portion curving upwardly and adapted to extend over a horse and to be secured to a single point on the harness of said horse, said shaft means, seat means, and arch axle frame means being flexible and having a spring constant to produce a fore and aft motion of said sulky at a frequency which conforms to the gait of the horse, and said shaft means being adjustable in both length and height, whereby said shaft means will fit horses of various conformations and natural gaits to produce the greatest sustained speed when operated by drivers of different weights.

7. The sulky of claim 6, wherein said spring constant $(k)$ combines with the effective mass $(m)$ of the driver and sulky to produce a natural frequency $(f)$ of fore and aft motion expressed by the equation $f = \tfrac{1}{2}\sqrt{k/m}$, said length and height of said shaft means being adjustable to produce a frequency $(f)$ that will match the frequency of the vertical motion of the horse at its maximum speed.

8. The sulky of claim 7, wherein said seat is adjustable to vary the distance between said seat and said arch axle frame means, whereby the distance may be adjusted for a particular driver to give the proper amount of lift to the horse, the position of said seat and the natural frequency of said sulky producing a periodic lift and forward thrust that is transferred to the horse through its harness to permit the horse to attain maximum speed.

9. The sulky of claim 8, wherein the rotational axes of said wheel means are placed aft of the flexural and torsional axis of said arch axle frame means to produce a castoring effect in said wheel means when said arch axle frame means flexes and to produce a forward thrust action in said sulky.

* * * * *